Patented Jan. 8, 1946

2,392,658

UNITED STATES PATENT OFFICE 2,392,658

METHYL VIOLET INK TONERS AND CARBON INKS

Werner F. Goepfert, Oradell, N. J., assignor to Interchemical Corporation, New York, N. Y., a corporation of Ohio No Drawing. Application May 15, 1942, Serial No. 443,130

4 Claims. (Cl. 106—23)

This invention relates to toners for carbon inks and to inks containing the same.

In the preparation of carbon inks, it is customary to add a dark colored toner to give the ink the desired shade or tone. The most common toners for this purpose are made from dye bases which are of deep blue to purple color, such as Victoria blue and methyl violet. These basic dye bases must be combined with an acid radical to develop the full color strength of the dye. If acid radicals of higher fatty acids are employed, the resulting dyes become oil soluble. For this purpose oleic acid has been used. However, the use of oleic acid has not been entirely satisfactory because the dye reaction product, or toner, shows an excessive amount of creeping and penetration into the paper. This usually becomes apparent as a discoloration or halo around the spot where the ink has been deposited by transfer from the carbon paper. Also, the strength of the ink is reduced by the creeping of the dye through the carbon paper backing, thus shortening the life or usefulness of the carbon paper.

Stearic acid has been suggested as a substitute for the oleic acid as a solubilizing agent for methyl violet, but stearic acid toners are too crystalline in nature so that inks containing them show a bloom on printing which is easily rubbed off. In addition the stearic acid modified methyl violet toner does not have the capacity to "wet" carbon black sufficiently to make its use practical.

This invention provides toners which are equal to or greater than the oleic acid treated dye bases in coloring strength, and which are characterized by their relative lack of creeping and at the same time do not cause a bloom on printing which can be rubbed off. Also, the toners show marked wetting of carbon black when milled in the usual waxes employed in making transfer inks. The invention also contemplates carbon inks containing the new toners.

The toners of this invention are made by combining methyl violet base with a fatty acid, or mixture of acids, selected from the group consisting of myristic and palmitic acids. It is believed that the dye base and acid form a compound of the type of an amine salt.

The myristic and palmitic acid reaction products, or toners, are unique in that they combine the characteristics of non-penetration into porous material on which the ink is placed and yet do not form a bloom on printed surfaces. Of these two fatty acids myristic is preferred because it imparts the best balance of non-penetration, wetting and printing qualities to the toners.

The preparation and use of these toners are illustrated in the following examples:

Example 1.—Myristic acid toner 91.2 parts by weight of myristic acid were heated to about 85° C., and 50 parts by weight of methyl violet base were added slowly with agitation. Upon complete addition of the dye base, the temperature was raised to 100° C., and maintained for fifteen minutes, after which the material was allowed to cool. The toner formed had a bronze-purple color, and possessed a relatively high viscosity. A more wax-like material may be obtained by using a greater proportion of myristic acid.

Example 2.—Palmitic acid toners

Another toner was prepared by employing palmitic acid in place of the myristic acid of Example 1. This toner was slightly more solid than the myristic acid toner, being a medium hard material which sheared very easily with a knife.

Example 3

Several carbon inks were prepared with the toners of Examples 1 and 2 by heating and grinding the following materials together:

| | Parts by weight |
|---|---|
| Carnauba wax | 15 to 25 |
| Mixture of carbon black and logwood black | 25 to 35 |
| Mineral oil | 25 to 35 |
| Toner of Example 1 or 2 | 1.5 to 4 |
| Victoria blue dye | 1.5 to 5 |

The Victoria blue dye was in the form of the HCl salt.

Other vegetable waxes may be substituted for part of the carnauba wax, such as candelilla wax. Also, the toners of this invention permit the uniform dispersion of carbon black in other waxy media, such as pentaerythritol dibehenate and stearyl alcohol, which ordinarily flocculate carbon black when other toners are used.

It is obviously not necessary that the acid medium with which the dye base is combined be pure myristic or palmitic acid, or a mixture thereof, but it should not contain very large amounts of other acids. Satisfactory carbon ink toners have been made according to this invention where the acid medium contained as much as about 20% of other fatty acids, but the amount of impurities should preferably be less than this.

Similarly, other dye bases may be added to the toners of this invention or to the inks containing the toners to obtain particular shades or hues. However, the benefits of this invention will not be realized in the formulation of carbon inks unless the methyl violet toners herein described constitute an appreciable part of the coloring materials used to tone the ink.

The employment of toners of this invention in certain kinds of printing inks forms the subject-matter of copending application Serial No. 443,128, filed May 15, 1942.

I claim:

1. The reaction product of approximately nine parts by weight of myristic acid and five parts by weight of methyl violet base, the product being an oil-soluble bronze-purple liquid of high viscosity which has a high dispersive action on carbon black in waxy and oily media.

2. A carbon ink comprising a wax vehicle, colored with a major proportion of carbon black, and a minor proportion of an oil-soluble toner, which is the reaction product of methyl violet base, and at least one fatty acid of the group consisting of myristic and palmitic acids, the ink being characterized by its lack of bloom, the lack of halo about impressions made therefrom on paper, and the excellent dispersion of the carbon black in the composition.

3. A carbon ink comprising a wax vehicle, colored with a major proportion of carbon black, and a minor proportion of an oil-soluble toner, which is the reaction product of methyl violet base, and myristic acid, the ink being characterized by its lack of bloom, the lack of halo about impressions made therefrom on paper, and the excellent dispersion of the carbon black in the composition.

4. A carbon ink comprising a wax vehicle in which carbon black tends to flocculate, colored with a major proportion of carbon black, and a minor proportion of an oil-soluble toner which is the reaction product of five parts by weight of methyl violet base, and nine parts by weight of at least one fatty acid of the group consisting of myristic and palmitic acids, the ink being characterized by its lack of bloom, the lack of halo about impressions made therefrom on paper, and the excellent dispersion of the carbon black in the composition.

WERNER F. GOEPFERT.